United States Patent Office 3,652,672
Patented Mar. 28, 1972

3,652,672
NOVEL DIIMINE COMPOUNDS
Jonathan M. Kliegman and Robert K. Barnes, Charleston, W. Va., assignors to Union Carbide Corporation, New York, N.Y.
No Drawing. Filed Apr. 27, 1970, Ser. No. 32,384
Int. Cl. C07c 119/00
U.S. Cl. 260—566 R    3 Claims

ABSTRACT OF THE DISCLOSURE

A compound of the general formula:

RN=CHCH=NR wherein R is either an i-propyl or t-butyl radical, and prepared by the reaction of an aqueous solution of glyoxal with a primary amine of the general formula:

RNH$_2$ wherein R is either the i-propyl or t-butyl radical. These compounds have been found to have excellent utility in inducing nonlethal physiological action on those subjected to its vapors.

BACKGROUND OF THE INVENTION

(1) Field of the invention

This invention relates to novel diimine compounds and to methods for preparing the same.

(2) Description of the prior art

Glyoxal, a well-known widely used chemical can be generally represented by the formula:

H—C=O
|
H—C=O

Glyoxal is most commonly available as a 40% aqueous solution. In this form glyoxal has no appreciable vapor pressure and is not, under atmospheric or vacuum stripping conditions, distillable from water. Aqueous solutions of glyoxal are nonexplosive, nonflammable, and, generally stable to storage. As mentioned previously, glyoxal solution is widely used in the industry and its use falls into two general classes (a) those using glyoxal as a reactive chemical intermediate in the preparation of materials such as pharmaceuticals, dyes, polymers, and additives for textile treatment; and (b) those using glyoxal alone to take advantage of its unique reactivity. To date, the reactions of glyoxal with primary and secondary aromatic and aliphatic amines have been studied to some extent but with conflicting results. One of the problems heretofore has been that commercially available or even laboratory prepared glyoxal was of undefined quality, thus preventing a definitive study of the chemistry of even the simplest of aliphatic amines. The high purity of the present grade of commercial glyoxal has now permitted such study.

SUMMARY OF THE INVENTION

The novel diimine compounds of the present invention are represented by the general formula:

RN=CHCH=NR wherein R is a member selected from the group consisting of the i-propyl and t-butyl radicals.

These compounds are prepared by reacting an aqueous glyoxal solution with a primary amine of the general formula:

RNH$_2$ wherein R is either the i-propyl radical or the t-butyl radical, at ambient temperature.

The reaction is illustrated by the following equation:

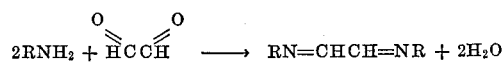

wherein R is as previously indicated.

DESCRIPTION OF THE SPECIFIC EMBODIMENTS

Thus when R of the starting compound RNH$_2$ is i-propyl, i.e. isoproplyamine, the compound N,N-bis-isopropylethylenedimine (I) is produced; when R is t-butyl, i.e. tertiarybutylamine, the compound N,N'-bis-t-butylethylenediimine (II) is produced.

These compounds have been found surprisingly to be extremely volatile, indeed they sublime at room temperature. The melting point of the compound represented by Formula I has been found to be between about 48° and 50° C., while the melting point of the compound represented by Formula II has been found to be between about 38° and 40° C. The volatility of the novel compounds is unexpected, since the other members of the aliphatic series are either high melting solids or high boiling liquids. The aromatic homologues are all high melting. Table I compares some of the physical properties of other members of the aliphatic series with the present invention compounds.

TABLE I

| Compound | M.P., °C. | B.P. | Sublimes or produces odor at room temp. |
|---|---|---|---|
| N,N'-biscyclohexyl-ethylenediimine. | 148-9 | | None. |
| N,N'-bis-n-butyl-ethylenediimine. | | 95–96° C. at 10 mm. | None. |
| N,N'-bis-isobutyl-ethylenediimine. | | 80–1° C. at 10 mm. | None. |
| N,N'-bis-isopropyl-ethylenediimine. | 48–50 | | Yes. |
| N,N'-bis-t-butyl-ethylenediimine. | 38–40 | | Yes. |

Reviewing the above data, it can be seen that the invention compounds N,N'-bis-isopropylethylenediimine and N,N'-bis-t-butylethylenediimine have melting points at least 100° lower than N,N'-biscyclohexylethylenediimine. It is to be noted that N,N'-bis-n-butylethylenediimine and N,N'-bis-isobutylethylenediimine have relatively high boiling points and do not sublime at room temperature, whereas, the invention compounds do sublime at room temperature. Thus, the behavior and properties of the compounds of the invention have proved to be entirely unexpected in view of the prior art.

Another aspect of the subject compounds, in contrast to the other members of the homologous series, has been their high degree of physiological activity characterized by lachrymation, stomach cramps and general physical incapacitation with low levels of lethality. For example, neither the cyclohexyl, n-butyl nor isobutyl compounds showed such physiological activity even when brought into physical contact with the subject's nose.

As mentioned, the subject diimines may be prepared by the reaction of between about 1 and 2 parts of 40% aqueous glyoxal with between about 2 and 8 parts of the appropriate primary amine at ambient temperature. Recovery of the resulting product is accomplished by conventional methods, e.g. filtration or distillation, preferably by filtration.

This invention will be further described in conjunction with the following illustrative examples. All temperatures cited are in degrees centigrade.

EXAMPLE 1

N,N'-bis-isopropylethylenediimine

Glyoxal, 72.5 g. 40%, 0.50 mole, was added dropwise to 59.0 g., 1.0 mole, isopropylamine at 0° C. After addition was complete the mixture was allowed to warm to room temperature, and after two days solidified. Gentle warming of the solid mass gave two layers. Separation in a warmed separatory funnel afforded the top layer which upon cooling resolidified. It was dissolved in warm ethyl ether and allowed to stand in Dry Ice (−80° C.) Filtration of the resultant precipitate gave 54.0 g. tan lachrymatory needles, M.P. 48–50° C., 77% yield. A small portion was sublimed (35° C. at 1 mm. Hg) for analysis.

Analysis.—Calc'd for $C_8H_{16}N_2$ (percent): C, 68.57; H, 11.43; N, 20.00. Mol wt., 140. Observed (percent): C, 68.48; H, 11.39; H, 20.03. Mol wt., 140 (mass spec.).

The NMR spectrum ($CDCl_3$) of this compound showed, in p.p.m. TMS, the following peaks: 1.18 (12.2H, D, J=7.0 c.p.s.); 3.50 (2. OH, Sept, J=7.0 c.p.s.); 7.97 (2. OH, S). The infrared spectrum was consistent with the diimine structure.

It was during the handling of this material after filtration that its lachrymatory powers were noted, causing the laboratory to be uninhabitable. The experimenter suffered no ill effects after the initial exposure.

EXAMPLE 2

N,N'-bis-t-butylethylenediimine t-Butylamine, 146 g., 2.0 mole, was added dropwise to 145 g. 40%, 1.0 mole, glyoxal at 0° C. The reactants soon solidified and water (50 cc.) was added to break up the solid mass. The white solid was isolated by filtration, dissolved in 500 c. ethyl ether, and dried with anhydrous magnesium sulfate. The volume of the resultant ether solution was reduced by evaporation to 200 cc. and cooled in Dry Ice (−80° C.). Filtration afforded 86.8 g. of extremely lachrymatory white solid, M.P. 39–43°. A second crop, 18.6 g. M.P. 34–40° C., was also obtained. Sublimation, 40° C. at 1 mm. Hg, gave an analytical sample. Total yield was 6.3%.

Analysis.—Calc'd for $C_{10}H_{20}N_2$ (percent): C, 71.43; H, 11.90; N, 16.67. Mol wt., 168. Observed (percent): C, 71.60; H, 11.60; N, 16.47. Mol wt., 168 (mass spec.).

The NMR spectrum ($CDCl_3$) of this compound, in p.p.m. from TMS, showed the following peaks: 1.07 (18.3H, S); 6.70 (1.8H, S). The infrared spectrum was consistent with the diimine structure.

It was in the course of handling this material during filtration that its lachrymatory powers were noted. The experimenter was overcome with severe lachrymation, coughing and discharges from the nose and mouth, along with stomach cramps. The attack occurred even though the reaction and recovery of the product were being carried out in a well-ventilated hood. The attack symptoms subsided in about five minutes, and the experimenter proceeded with the rest of the experiment. The experimenter has not observed any side effects from this exposure once the effects of the initial exposure had subsided.

EXAMPLE 3

N,N'-bis-isobutylethylenediimine

Glyoxal, 145 g. 40%, 1.0 mole, was added dropwise to 146 g., 2.0 mole, isobutylamine at 0°. A solid formed initially but soon dissolved. After the addition was complete, the solution was warmed gently and two layers formed. These were separated, the lower aqueous layer washed with ethyl ether and the washings added to the organic layer. This solution was dried with anhydrous sodium sulfate and distilled giving 47.5 g. light yellow liquid, B.P. 78–83° C. at 10 mm. Hg, $N_d^{25}$ 1.4515, yield 28%. This was redistilled through a Nester-Faust spinning-band column giving 43.6 g. colorless liquid, B.P. 80–1° C. at 10 mm. Hg, $N_d^{25}$ 1.4518.

Analysis.—Calc'd for $C_{10}H_{20}N_2$ (percent): C, 71.43; H, 11.70; N, 16.67. Observed (percent): C, 71.29; H, 11.99; N, 16.37.

The NMR spectrum ($CDCl_3$) of this compound in p.p.m. from TMS showed the following peaks: 0.90 (6.3H, D, J=6.5 c.p.s.); 1.88 (1H, M, J=6.3 c.p.s.); 3.3 (1.6H, D, J=6.5 c.p.s.); 7.77 (0.9H, S). The infrared spectrum was consistent with the diimine structure.

The compound exhibited no lachrymatory properties.

EXAMPLE 4

N,N'-bis-n-butylethylenediimine

Glyoxal, 145 g. 40%, 1.0 mole, was added dropwise to 293 g., 4.0 mole, n-butylamine at 0–10°. After addition was complete the pasty mixture was heated at reflux for an hour and then allowed to stand for 2 days, after which time two layers had formed. The top layer was separated and distilled giving 56.0 g. tan liquid, B.P. 93–5° C. at 10 mm. Hg [reported 100–1° at 10 mm. Hg], 34% yield. Redistillation through a Nester-Faust spinning-band column gave 29.9 g. colorless product, B.P. 95–6° C. at 10 mm. Hg, $N_d^{25}$ 1.4548. As in the first distillation there was a great deal of residue. These residues showed a large band at 5.9–6.0µ in the infrared.

The NMR spectrum ($CDCl_3$) of the compound showed, in p.p.m. from TMS, the following peaks: 0.95 (M); 1.42 (M); 3.50 (TR, J=6.0 c.p.s.); 7.78 (S).

The compound exhibited no lachrymatory properties.

EXAMPLE 5

N,N'-bis-cyclohexylethylenediimine

A solution of 40.5 g., 0.40 mole, cyclohexylamine in 100 ml. methyl alcohol was mixed with 27.0 g. 40%, 0.20 mole, glyoxal and cooled (0°). The white solid that separated was collected on a filter. Recrystallization of this material from methanol/water gave 42.0 g. needles, M.P. 145–7° [reported 148–9°], 95% yield. The NMR spectrum ($CDCl_3$) showed, in p.p.m. from TMS, the following peaks: 1.67 (20H, M); 3.20 (1.9H, M); 7.93 (1.9H, S).

The compound exhibited no lachrymatory properties.

The chloroplatinate salts of N,N'-bis-t-butylethylenediimine have also been prepared as is shown in the example below.

EXAMPLE 6

N,N'-bis-t-butylethylenediimine hydrochloroplatinate

A solution containing 0.50 g., 0.00097 mole, chloroplatinic acid in 10 ml. glacial acetic acid was added to 0.39, 0.0022 mole N,N'-bis - t - butylethylenediimine in 10 ml. glacial acetic acid. The resultant solid was filtered, washed with acetic acid, ethyl ether and dried to give 0.43 g. yellow solid, M.P. 256° dec., yield 77%.

Analysis.—Calc'd for $C_{10}H_{22}N_2PtCl_6$: Cl, 36.85%. Observed: Cl, 36.99%.

The compounds of the invention have utility for riot control purposes and for personal protection against assault. For this purpose the compounds of the invention may be packaged in a pressurized container with a suitable propellant. Suitable propellants include fluorocarbons, such as $CCl_3F$, $CCl_2F_2$ and $CHClF_2$, low-boiling hydrocarbons, such as propane, butane and isobutane, and other volatile gases, such as vinyl chloride, dimethyl ether, carbon dioxide and nitrous oxide. The pressurized containers would, of course, be provided with suitable known mechanisms for release of the contents, when required.

What is claimed is:

1. A compound of the general formula:

$$RN=CHCH=NR$$

wherein R is a member selected from the group consisting of i-propyl and t-butyl radicals.

2. The compound according to claim 1 wherein R is the i-propyl radical and the compound is N,N'-bis-isopropylethylenediimine.

3. The compound according to claim 1 wherein R is the t-butyl radical and the compound is N,N'-bis-t-butylethylenediimine.

References Cited

UNITED STATES PATENTS 3,267,078    8/1966    Damusis ......... 260—566 R

LEON ZITVER, Primary Examiner

G. A. SCHWARTZ, Assistant Examiner

U.S. Cl. X.R.

424—45, 325

Disclaimer 3,652,672.—*Jonathan M. Kleigman* and *Robert K. Barnes*, Charleston, W. Va. NOVEL DIIMINE COMPOUNDS. Patent dated Mar. 28, 1972. Disclaimer filed June 18, 1973, by the assignee, *Union Carbide Corporation*.

Hereby enters this disclaimer to claims 1–3 of said patent.

[*Official Gazette November 6, 1973.*]